(12) United States Patent
Barberis et al.

(10) Patent No.: US 6,997,520 B1
(45) Date of Patent: *Feb. 14, 2006

(54) CONTROL AND COMMUNICATION SYSTEM FOR RAILWAY TRAINS

(75) Inventors: Dario Barberis, Turin (IT); Roberto Tione, Lauriano (IT)

(73) Assignees: SAB WABCO S.p.A., Piossasco (IT); Alstom Transport S.A., Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 09/611,230

(22) Filed: Jul. 6, 2000

(51) Int. Cl.
*B60T 13/74* (2006.01)

(52) U.S. Cl. .................. 303/3; 303/128; 303/122.04; 303/199; 701/19; 340/825; 188/34

(58) Field of Classification Search .............. 303/3, 303/7, 15, 20, 199, 123, 122.04, 122.05, 303/128; 701/1, 19, 20; 246/23, 59, 167 R, 246/182 A; 105/4.3, 48; 188/3 R, 33, 34; 307/9.1, 43; 340/533, 536, 825, 825.01, 340/825.02
See application file for complete search history.

(56) References Cited

U.S. PATENT DOCUMENTS

| | | | | |
|---|---|---|---|---|
| 3,384,033 A | * | 5/1968 | Ruff ............................ | 105/61 |
| 3,482,089 A | * | 12/1969 | Raffel et al. ............ | 246/182 R |
| 3,532,228 A | * | 10/1970 | Beyer ......................... | 213/212 |
| 3,651,765 A | * | 3/1972 | Grundy ....................... | 105/61 |
| 3,696,758 A | * | 10/1972 | Godinez, Jr. ................ | 105/61 |
| 4,041,470 A | * | 8/1977 | Slane et al. .................... | 701/35 |
| 4,056,286 A | * | 11/1977 | Burkett ......................... | 303/20 |
| 4,266,485 A | * | 5/1981 | Bruner et al. ................. | 105/61 |
| 4,652,057 A | * | 3/1987 | Engle et al. .................... | 303/3 |
| 4,817,019 A | * | 3/1989 | Morihara .................... | 364/550 |
| 5,170,666 A | * | 12/1992 | Larsen ......................... | 73/571 |

(Continued)

FOREIGN PATENT DOCUMENTS

DE      44 22 261 C1      6/1995

(Continued)

OTHER PUBLICATIONS

Sonders E: "Elektrische/Elektronische Brems-Abfrage Und Steuerung Fur Gueterzuge" Zeitschrift Fur Eisenbahnwesen Und Verkehrstechnik. Die Eisenbahntechnik + Glasers Annalen, Georg Siemens Verlagsbuchhandlung. Berlin, DE, vol. 119, No. 11/12, Nov. 1, 1995, pp. 505-509, 512, XP000546707 ISSN: 0941-0589 *p. 506-p. 509; figures 5,7-9*.

*Primary Examiner*—Melody M. Burch
(74) *Attorney, Agent, or Firm*—Sughrue Mion, PLLC

(57) ABSTRACT

The system utilizes two bi-directional transmission lines which extend parallel to and spaced form one another along the train; a control unit operating as a main unit installed on the main engine is connected to the transmission lines and to brake control systems or devices for the train; a plurality of slave control units, each of which is installed on a respective carriage or wagon, are connected to both transmission lines, to solenoid valve units associated with pneumatic brake actuators, and to sensor devices associated with the carriage or wagon. The main control unit and the slave control units are arranged to communicate with one another via the transmission lines according to a predetermined serial protocol. The main control unit being arranged to detect a condition in which the transmission lines are both interrupted, each between different pairs of slave control units, and to provide a transfer command signal to send the brake control signals to two slave control units between which there is an interruption of one of the transmission lines, in such a way that all the slave control units are able to communicate with the main control unit via a provisional transmission line.

9 Claims, 3 Drawing Sheets

U.S. PATENT DOCUMENTS

| | | | |
|---|---|---|---|
| 5,309,155 A * | 5/1994 | Hsien et al. | 340/907 |
| 5,551,653 A * | 9/1996 | Friebe et al. | 246/167 R |
| 5,630,565 A | 5/1997 | Lumbis | |
| 5,638,276 A * | 6/1997 | Hart | 364/426.01 |
| 5,722,736 A * | 3/1998 | Cook | 303/15 |
| 5,730,504 A * | 3/1998 | Gaughan | 303/3 |
| 5,746,484 A * | 5/1998 | Gaughan et al. | 303/3 |
| 5,777,547 A * | 7/1998 | Waldrop | 340/438 |
| 5,808,370 A * | 9/1998 | Bezos | 307/9.1 |
| 5,835,845 A * | 11/1998 | Niki et al. | 725/114 |
| 5,862,048 A * | 1/1999 | Knight | 700/9 |
| 5,927,822 A * | 7/1999 | Hart | 303/7 |
| 6,546,318 B2 * | 4/2003 | Barberis et al. | 701/20 |
| 2001/0037167 A1 * | 11/2001 | Barberis et al. | |

FOREIGN PATENT DOCUMENTS

| | | |
|---|---|---|
| EP | 0 825 086 A2 | 2/1998 |
| EP | 0 832 800 A2 | 4/1998 |
| EP | 0958980 A2 * | 11/1999 |
| GB | 2312260 A * | 10/1997 |
| JP | 09 284317 A | 10/1997 |

* cited by examiner

CONTROL AND COMMUNICATION SYSTEM FOR RAILWAY TRAINS

BACKGROUND OF THE INVENTION

The present invention relates to a control and communication system for railway trains, particularly to railway trains of so-called high composition, that is to say comprising a large number of carriages or wagons.

Conventionally, a railway train brake control is actuated pneumatically and in the case of trains with a large number of carriages or wagons can give rise to problems both because of the limited speed of propagation of the required braking information along the so-called general duct (a speed which must not be less than 250 m/sec- and which is, however, usually less than 300 m/sec), and above all because of the slow rate at which the pressure in the auxiliary reservoirs of the individual carriages or wagons is re-established via the general duct during braking.

These problems mean that for very long trains in transit on tracks characterised by significant inclinations, braking becomes practically ungovernable, to the point of reducing the operating speed to values incompatible with the requirements of an optimum use of the lines.

In the case of railway trains with a large number of carriages or wagons it is often necessary to have recourse to locomotives or supplementary engines ganged together at the front of the train, or in intermediate positions and/or at the tail. This arrangement involves in each case the adoption of arrangements to ensure the operating synchronisation of the various locomotives or engines both during the driving phase and in the "coasting" phase as well as during imposed braking (braking of the diesel or electric motors of the engines). The operating synchronism between various motors remote from one another is commonly achieved by human supervision of each traction machine: the driver of each auxiliary engine communicates, usually by way of radio telephone, with the driver of the leading locomotive (main engine) and receives suitable instructions on the manoeuvres to perform. This arrangement involves working inefficiencies, loss of time and easily imaginable potential manoeuvring errors.

Only for certain determined trains, generally those adapted for passenger services, has there been proposed the use of hard wired remote control systems for automatically co-ordinating the operation of the various locomotives or engines of a train.

In very recent times experimental applications have been tried in which recourse has been made to communication systems along the train with the use of twin wire supports. Such applications, however, run into problems associated with the quantity of transmissible information. In other experiments problems related to the quantity of information have not arisen, the need for use in high composition trains, to introduce repeater apparatus which is intrinsically rather expensive has been demonstrated.

SUMMARY OF THE INVENTION

The object of the present invention is to provide a control and communication system for a railway train which comprises at least one main engine and a plurality of carriages or wagons, which system makes it possible to avoid the problems outlined above.

BRIEF DESCRIPTION OF THE DRAWINGS

Further characteristics and advantages of the invention will become apparent from the following detailed description made purely by way of non-limitative example, with reference to the attached drawings, in which.

DETAILED DESCRIPTION OF THE INVENTION

Figure 1:
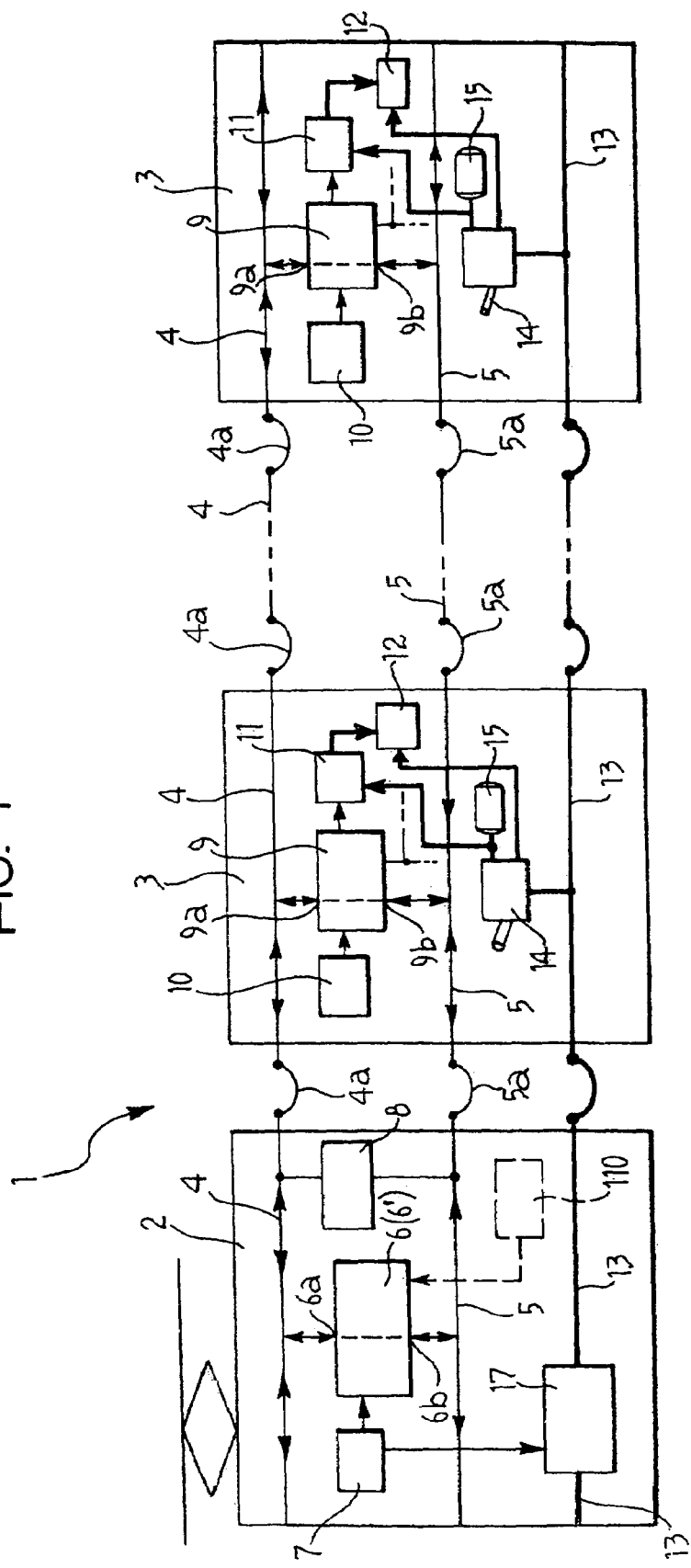
FIG. 1 is a schematic representation of a railway train provided with a control and communication system according to the invention, shown in block diagram form.

In FIG. 1 the reference numeral 1 generally indicates a railway train comprising a main or leading engine 2 and a plurality of carriages or wagons 3.

The engine 2 is for example an electric locomotive, or may be a diesel engine locomotive. The carriages or wagons 3 can be wagons for the transport of merchandise or carriages for the transport of passengers.

The train 1 of FIG. 1 is provided with a control and communication system comprising first and second bi-directional transmission lines indicated 4 and 5, which extend parallel to and spaced from one another along the entire train through the various carriages or wagons 3.

The lines 4 and 5 are conveniently constituted for example by twin wire lines of the twisted pair type. Each of these lines comprises respective sections or portions which extend through the engine and each of the carriages, and which are interconnected together between the engine and the carriage adjacent to it, as well as between the individual carriages, by coupling pieces 4a and 5a.

Conveniently the lines 4 and 5 extend within the engine and each carriage, in spaced relation from one another, and likewise the coupling portions 4a and 5a are spaced from one another for the purpose of avoiding, as far as possible, accidental interruptions of both lines at the same section.

As will become apparent more clearly hereinafter, the lines 4 and 5 are able to allow the transmission of electrical energy for power supply purpose alone train as well as control signals and information or state signals of serial type with the so-called travelling wave technique.

The control and communication system comprises a main control unit 6 installed on the engine 2 and provided with a pair of bi-directional input/output ports 6a and 6b respectively connected to the line 4 and the line 5.

The main control unit 6 is conveniently formed using microprocessor technology, and is connected to the brake control device 7 of the train, installed on the engine.

On the engine 2, between the lines 4 and 5, there is connected a supply device 8 operable to deliver to these lines the electrical currents necessary for power supply of the electrical and electronic devices installed on the carriages or wagons 3, about which more will be said hereinafter. The supply device 8 can be incorporated in the control unit 6.

On each carriage or wagon 3 there is installed a slave control unit 9 provided with a pair of bi-directional input/output ports 9a, 9b, respectively connected to the transmission lines 4 and 5.

Each slave control unit 9 is formed for example using microprocessor technology and is able to receive the necessary electrical supply for its operation as well as control signals and/or state or information signals, via the lines 4 and 5.

To the control unit 9 in each carriage or wagon 3 there are connected sensor devices, generally indicated 10, operable to provide electrical signals indicative of conditions or states of devices on board, such as, for example, solenoid valves of the brake system, and/or signals indicative of the values assumed by certain monitoring parameters such as pneumatic brake pressure, weight acting on the suspension etc.

The control unit 9 of each carriage or wagon 3 is also connected to electro-pneumatic actuator devices 11 such as, for example, solenoid valve assemblies, which control the supply and discharge of compressed air to brake cylinders 12 associated with the carriage or wagon.

In a manner known per se the railway train 1 includes a pneumatic braking system having a pneumatic duct 13 which extends along the entire train. On board each carriage or wagon 3 there is, in general, connected a pneumatic brake control distributor 14, connected to the general duct 13, and operable to control the delivery of air under pressure from (at least) one auxiliary on-board reservoir 15 to the braking cylinders 12 of the carriage or wagon.

On board the engine 2 the pressure of the general duct 13 is suitably regulated by means of an electro-pneumatic device 17 associated with the control device 7, taking compressed air from pneumatic supply devices of type known per se and not illustrated.

By way of example the general duct 13 is maintained in normal conditions at a pressure of 5 bar.

In conventional pneumatic brake systems the brake command information is represented by a reduction in the pressure in the general duct 13, for example from 5 bar to 3.5 bar, following which the distributors 14 of the individual carriages or wagons cause the delivery of air under pressure from the associated reservoir 15 to the brake cylinders 12. In such conventional systems, during braking, the pressure in the general duct 13 is returned to the nominal value by delivering air under pressure to the reservoirs 15 of the carriages or wagons 3 via the associated distributors 14.

With the control and communication system according to the invention the brake command information is no longer nominally transmitted by pneumatic means through the general duct 13 but rather via electrical means, by means of signals of serial type for control of the brake, which the main control unit 6 of the engine 2 transmits to the slave control units 9 of the individual carriages or wagons via one of the transmission lines 4 and 5. Following reception of brake command signals the slave control units 9 of individual carriages or wagons 3 control the solenoid valve units 11 in such a way that these latter cause the required passage of air under pressure from the reservoir 15 to the brake cylinders 12 bypassing the distributors 14.

In this way the control and communication system according to the invention obviates the problems of prior art systems relating to the propagation by pneumatic means of the information for controlling the brake. This is particularly convenient for very long railway trains, or rather trains comprising a very large number of carriages or wagons.

After braking, in the subsequent brake release phase, the supply of air under pressure to the reservoirs 15 of the carriages or wagons 3 is nevertheless ensured via the general duct 13.

The presence of the distributor 14 on board each carriage or wagon nevertheless allows the delivery of brake command information by pneumatic means via a controlled reduction in the pressure in the general duct 13 in an entirely conventional manner if the electronic control and communication system associated with the lines 4 and 5 should be in a failure or breakdown condition which can not be immediately rectified.

In the control and communication system, the main control unit 6 on board the engine 2 is conveniently arranged to send priority signals to the slave control units 9 of the individual carriages or wagons 3 for the control of the brake utilising one of the two communication lines 4 or 5, and periodically to receive from each of the said slave control units information or state signals via the other of the said lines.

The system has an intrinsic redundancy thanks to the presence of two communication lines along the entire train.

Conveniently, the main control unit 6 is arranged to detect and determine the location of possible interruptions which may occur on one of the communication lines 4, 5. The occurrence of an interruption and its location along the train can be detected for example by the fact that the main control unit 6 no longer receives the information or state signals from the control units 9 of the carriages or wagons 3 situated downstream of the interruption.

In the event of interruption of a line 4 or 5 the main control unit 6 is arranged to utilise the still active line for the delivery of brake control priority signals to the slave control units 9 of the various carriages or wagons. In such a situation the control unit 6 can suspend the acquisition of information or state signals from the various slave units 9, or else the exchange of such information can nevertheless continue on the single surviving line, in this case with the overall performance of the system being partially degraded.

Figure 2:
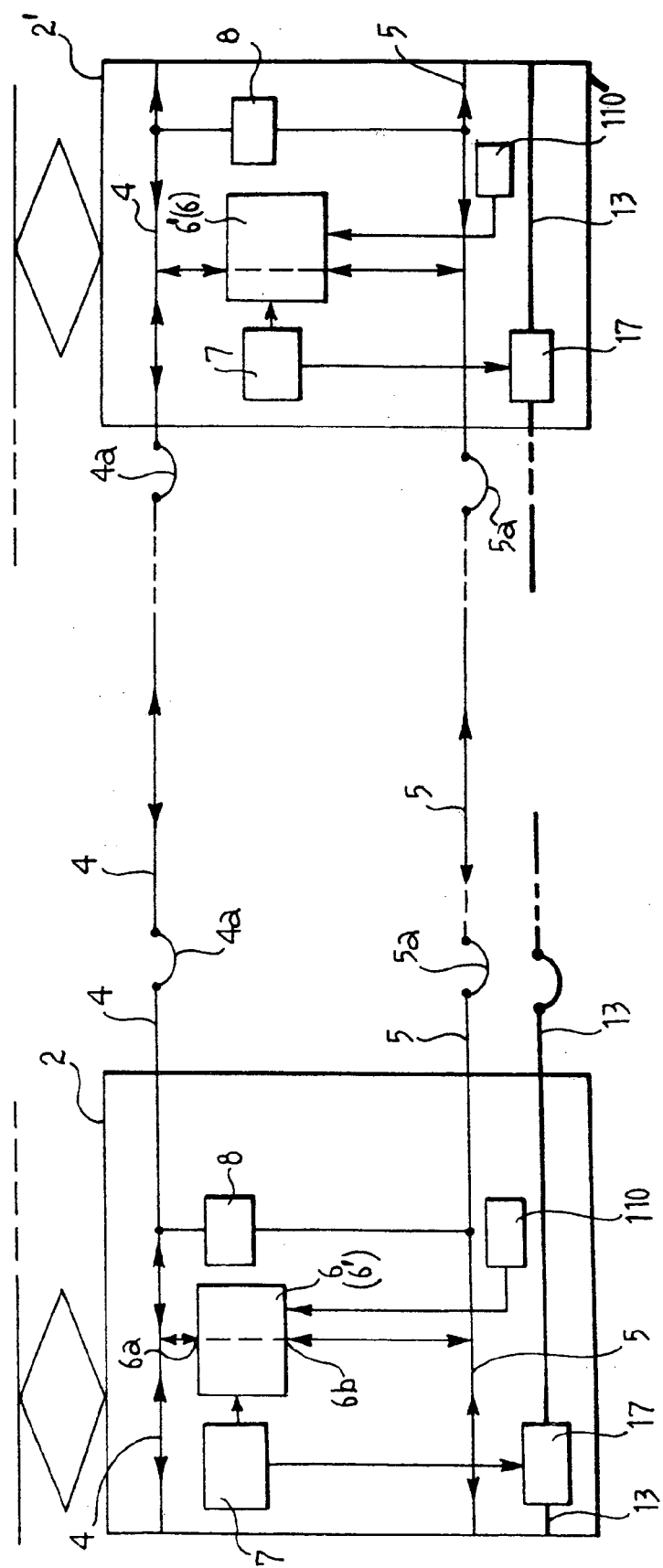
FIG. 2 shows the application of a control and communication system according to the invention to a railway train including a main locomotive or engine and at least one auxiliary locomotive or engine.

The railway train 1 can include, as well as the main or lead engine 2, at least one further auxiliary engine such as that indicated 2' in FIG. 2. Conveniently the or each auxiliary engine 2' is also traversed by the transmission lines 4 and 5, and is also provided with a control unit 6' connected to these lines.

This unit is conveniently arranged to be able to function as a main unit as described hereinabove, or as a slave unit. This is done for the purpose of allowing the use of the various engines both as main engines and as auxiliary engines. Advantageously the same can be true for the unit 6 of the main engine 2.

This arrangement allows the delivery of synchronisation signals to the control unit 6' of the or each auxiliary engine 2' by the main control unit 6 of the lead engine 2 by means of the transmission lines 4 and 5. This makes it possible to achieve an adequate operating synchronism between the various engines of the train avoiding the previously indicated disadvantages.

To the control unit 6' of the or each auxiliary engine 2' there are conveniently connected sensors or transducers 110' to provide information or state signals intended to be transmitted to the main control unit 6 of the lead engine 2 via one or the other of the transmission lines 4 and 5 for feedback verification by the main control unit 6 of the synchronisations of the various operations. Sensors or transducers 110 could also be provided in the lead engine 2.

Advantageously, the slave control units 9, 6' associated with the carriages or wagons 3 and possible auxiliary engines 2' are arranged to be able to acquire and transmit signals from one or the other of the transmission lines 4, 5 equally. Such control units are moreover able, when they receive a specific transfer command signal from the main control unit 6, to transfer the command signals or information signals received on one line 4 or 5 on to the other line 5 or 4.

Figure 3:
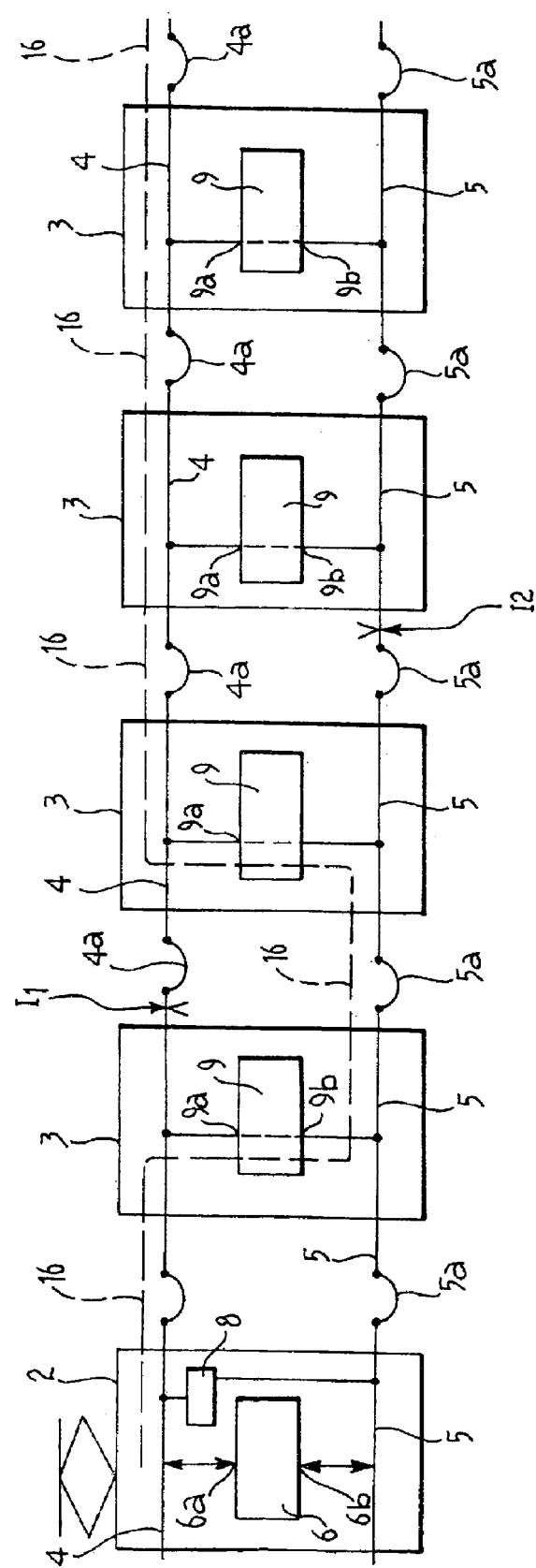
FIG. 3 is a simplified diagram of a train provided with a system according to the invention, in which there is shown an operating strategy for a failure condition.

The main control unit 6 is moreover advantageously prearranged to detect a possible condition in which the transmission lines 4 and 5 are interrupted each between different pairs of slave control units, such as the condition illustrated by way of example in FIG. 3, in which the two interruptions are indicated I1 and I2. Upon detection of such a condition the main control unit 6 sends the transfer command signals to at least two slave control units between which there is an interruption of one of the transmission lines 4, 5.

In the example of FIG. 3, the transfer command signals are transmitted (for example) to the control units 9 for the first and second carriage 3 after the engine, between which the interruption 11 has occurred. In this way all the slave control units 9 and possibly 6' of the train are nevertheless able to communicate with the main control unit 6 via a provisional transmission line 16 indicated in broken outline in FIG. 3, which comprises portions of both transmission lines 4 and 5, and the slave control units 9 or 6' to which the transfer command signals have been sent.

With the system described above a minimum essential operability of the communication and control system can always be ensured except in the very low probability case of simultaneous interruption of both the lines 4 and 5 between two consecutive carriages or wagons.

In emergency operation in a condition of the type exemplified in FIG. 3, the provisional transmission lines 16 can be utilised for the delivery of only brake command signals or for the delivery of such signals as well as information or state signals, in this latter case with a partial degradation of the performance of the system.

In operation in an emergency condition of the type shown in FIG. 3, the provisional line 16 is nevertheless usable for the propagation of the electricity supply for the various slave control units 9 and 6'.

Naturally, the principle of the invention remaining the same, the embodiments and details of construction can be widely varied with respect to what has been described and illustrated purely by way of non-limitative example, without by this departing from the ambit of the invention as defined in the attached claims.

The invention claimed is:

1. A communication and control system in combination with a railway train which comprises at least one main engine and a plurality of carriages or wagons,
the communication and control system comprising
first and second bi-directional transmission lines which extend parallel to and spaced from one another along the train;
a main control unit installed on said at least one main engine and connected, in said at least one main engine, to both said transmission lines and to brake control systems or devices of the train;
a plurality of slave control units each of which is installed upon a respective carriage or wagon and is connected, in the respective carriage or wagon, to both said transmission lines, to solenoid valve units associated with pneumatic brake cylinders for controlling the solenoid valve units and to sensor devices associated with the respective carriage or wagon;
the main control unit and the slave control units being arranged to communicate with one another via said transmission lines according to a predetermined serial protocol;
the main control unit being arranged to transmit to the slave control units serial brake control signals, and to receive and acquire serial information or status signals from said slave control units via at least one of said transmission lines,
wherein the slave control units are arranged to acquire and transmit said brake control or said information signals selectively on either the first or second bi-directional transmission line equally, and are moreover operable, when the slave control units receive said brake control signals on said first bi-directional transmission line, to transfer to the second transmission line said brake control or said information signals received on said first bi-directional transmission line; the main control unit being arranged to detect a condition in which said transmission lines are both interrupted, each between different pairs of slave control units, and to provide a transfer command signal to send said brake control signals to at least to said different pairs of slave control units between which there is an interruption of one of said transmission lines, in such a way that all the slave control units are able to communicate with the main control unit via a provisional transmission line comprising portions of both said bi-directional transmission lines and the slave control units which have been sent said brake control signals.

2. The system according to claim 1 further comprising at least one auxiliary engine;
said at least one auxiliary engine being also provided with a control unit capable of acting as a slave control unit connected to said bi-directional transmission lines and arranged to receive synchronization signals coming from the control unit of the at least one main engine and to transmit additional information or status signals to the main control unit of the at least one main engine via at least one of said bi-directional transmission lines.

3. The system according to claim 1, wherein the main control unit is arranged to transmit said brake control signals to the slave control units via one of said bi-directional transmission lines and to receive said information signals coming from said slave control units via the other of said bi-directional transmission lines.

4. The system according to claim 1, wherein the main control unit is arranged to detect and determine the location along the train of a position of a failure of one of said bi-directional transmission lines.

5. The system according to claim 4, wherein the main control unit is arranged, in case of said failure of one of said bi-directional transmission lines, to transmit at least the brake control signals and possible synchronization signals for one or more auxiliary engines on the other of said bi-directional transmission lines.

6. The system according to claim 1, wherein said bi-directional transmission lines are further connected to electrical power supply devices which can be activated in said at least one main engine to distribute power to the slave control units.

7. The system according to claim 6, wherein the slave control units are arranged to allow the passage of electrical power from one of said bi-directional transmission lines to the other which are connected, when the slave control units receive said transfer command signal, in such a way that when both said transmission lines are interrupted, each between different pairs of slave control units, all said slave control units can be supplied with electrical power propagated through said provisional transmission line.

8. The system according to claim 1, wherein the slave control units are arranged to allow the passage of electrical power from one of said bi-directional transmission lines to the other which are connected, when the slave control units receive said transfer command signal, in such a way that when both said bi-directional transmission lines are interrupted, each between different pairs of slave control units, all said slave control units can be supplied with electrical power propagated through said provisional transmission line.

9. The system according to claim 1, wherein said transmission lines are traveling wave twin wire lines operable to transmit electrical power and said serial brake control signals simultaneously.

* * * * *